United States Patent
Kimura et al.

(10) Patent No.: US 9,614,221 B2
(45) Date of Patent: Apr. 4, 2017

(54) LITHIUM-ION SECONDARY BATTERY

(71) Applicant: HITACHI, LTD., Tokyo (JP)

(72) Inventors: Naoki Kimura, Tokyo (JP); Eiji Seki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 14/830,205

(22) Filed: Aug. 19, 2015

(65) Prior Publication Data

US 2016/0072125 A1    Mar. 10, 2016

(30) Foreign Application Priority Data

Sep. 10, 2014 (JP) .................. 2014-183742

(51) Int. Cl.
*H01M 2/18* (2006.01)
*H01M 4/38* (2006.01)
(Continued)

(52) U.S. Cl.
CPC ........... *H01M 4/386* (2013.01); *H01M 4/134* (2013.01); *H01M 4/48* (2013.01); *H01M 4/483* (2013.01);
(Continued)

(58) Field of Classification Search
CPC ...... H01M 4/134; H01M 4/366; H01M 4/386; H01M 4/48; H01M 4/483; H01M 4/587;
(Continued)

(56) References Cited

U.S. PATENT DOCUMENTS

2012/0321911 A1* 12/2012 Watanabe .............. C01G 51/42
429/5

FOREIGN PATENT DOCUMENTS

| JP | 2009-295289 A | 12/2009 |
|---|---|---|
| JP | 2012-104320 A | 5/2012 |

* cited by examiner

*Primary Examiner* — Brittany Raymond
(74) *Attorney, Agent, or Firm* — Volpe and Koenig, P.C.

(57) ABSTRACT

A lithium-ion secondary battery of the present invention contains: a laminated electrode group formed of a rectangular positive electrode; a rectangular negative electrode; and a separator. In such a laminated electrode group, the positive electrode includes a positive electrode current collector foil, and a positive electrode mixture layer containing a positive electrode active material, the negative electrode includes a negative electrode current collector foil, and a negative electrode mixture layer containing a negative electrode active material. The negative electrode active material includes a silicon-based material, and a carbonaceous material. A mass ratio of the silicon-based material and the carbonaceous material is 20:80 to 80:20. The silicon-based material is a Si alloy or $SiO_x$ ($0.5 \leq x \leq 1.5$). The positive electrode and the negative electrode have a collection terminal protruding from a same side of the laminated electrode group. The negative electrode current collector foil is formed of any one of a stainless steel; a copper alloy containing a copper with a purity of 99.9% or more, and one or more kinds of elements selected from the group consisting of zirconium, silver and tin; and a copper with a purity of 99.99% or more. When a comparison are drawn between lengths of the positive electrode mixture layer and the negative electrode mixture layer in a direction where the collection terminal protrudes from the same side, the length of the positive electrode mixture layer is the length of the negative electrode mixture layer or longer. Thus, a short circuit in charging and discharging of the lithium-ion secondary battery can be suppressed.

10 Claims, 8 Drawing Sheets

(51) Int. Cl.
| | |
|---|---|
| *H01M 4/48* | (2010.01) |
| *H01M 4/583* | (2010.01) |
| *H01M 4/66* | (2006.01) |
| *H01M 4/70* | (2006.01) |
| *H01M 10/0525* | (2010.01) |
| *H01M 4/134* | (2010.01) |
| *H01M 4/587* | (2010.01) |
| *H01M 10/02* | (2006.01) |
| *H01M 10/0585* | (2010.01) |
| *H01M 4/36* | (2006.01) |

(52) U.S. Cl.
CPC ........... *H01M 4/587* (2013.01); *H01M 4/661* (2013.01); *H01M 4/70* (2013.01); *H01M 10/02* (2013.01); *H01M 10/0525* (2013.01); *H01M 10/0585* (2013.01); *H01M 4/366* (2013.01)

(58) Field of Classification Search
CPC .... H01M 4/661; H01M 4/70; H01M 10/0525; H01M 10/0585; H01M 10/02; Y02E 60/122
See application file for complete search history.

LITHIUM-ION SECONDARY BATTERY

CLAIM OF PRIORITY

The present application claims priority from Japanese Patent application serial No. 2014-183742, filed on Sep. 10, 2014, the content of which is hereby incorporated by reference into this application.

BACKGROUND OF THE INVENTION

1. Field of the Invention

This invention relates to short circuit suppression in charging and discharging of a lithium-ion secondary battery.

2. Description of the Related Art

In view of a problem of global warming and depletion of fuel, an electric vehicle (EV) has been developed by each auto manufacturer. As a power source of the EV power, a lithium-ion secondary battery with high energy density is required. In recent years, an active material containing Si has been expected in order to obtain the high energy density. It has been known that Si has large volume changes associated with charging and discharging.

In general, a lithium-ion secondary battery has an electrode group constituted of a positive electrode, a negative electrode, and a separator.

In JP-2012-104320-A, as an example of a negative electrode active material, Si and silicon oxide are mentioned, and a cross-sectional structure of a battery in which the dimension of the negative electrode is larger than that of the positive electrode is illustrated.

In JP-2009-295289-A, a cross-sectional structure of a battery in which the dimension of the negative electrode is larger than that of the positive electrode is illustrated.

This is because Li released from the positive electrode is received at the negative electrode, and in a case where the negative electrode is small, Li may be precipitated in current collector foil-exposed part of the negative electrode terminal part.

SUMMARY OF THE INVENTION

A lithium-ion secondary battery of the present invention contains: a rectangular positive electrode; a rectangular negative electrode; and a separator, in which the positive electrode, the negative electrode, and the separator constitute a laminated electrode group, the positive electrode includes a positive electrode current collector foil, and a positive electrode mixture layer containing a positive electrode active material, the negative electrode includes a negative electrode current collector foil, and a negative electrode mixture layer containing a negative electrode active material, the negative electrode active material includes a silicon-based material, and a carbonaceous material, a mass ratio of the silicon-based material and the carbonaceous material is 20:80 to 80:20, the silicon-based material is a Si alloy or $SiO_x$ ($0.5 \leq x \leq 1.5$), the positive electrode and the negative electrode have a collection terminal protruding from a same side of the laminated electrode group, the negative electrode current collector foil is formed of any one of a stainless steel; a copper alloy containing a copper with a purity of 99.9% or more, and one or more kinds of elements selected from the group consisting of zirconium, silver and tin; and a copper with a purity of 99.99% or more, and when a comparison are drawn between lengths of the positive electrode mixture layer and the negative electrode mixture layer in a direction where the collection terminal protrudes from the same side, the length of the positive electrode mixture layer is the length of the negative electrode mixture layer or longer.

According to the present invention, a short circuit in charging and discharging of the lithium-ion secondary battery can be suppressed.

DESCRIPTION OF THE PREFERRED EMBODIMENTS

An object of the present invention is to suppress a short circuit in charging and discharging of a lithium-ion secondary battery.

A negative electrode active material containing Si has large volume changes associated with charging and discharging.

The present inventors have revealed that as a result of an in-situ observation in charging and discharging of an electrode using Si that has large volume changes associated with charging and discharging as a negative electrode active material, the expansion and contraction of a negative electrode having a certain amount of Si are generated not only in a thickness direction, but also in a length direction (including both of the length and width directions) of a mixture layer. In other words, a mixture layer formed on a surface of a current collector foil expands and contracts in a direction of protruding from the current collector foil. Further, the present inventors have revealed that in a case of a laminated-structure electrode group having a constitution in which collector tabs of positive electrode and negative electrode are protruded from the same one side, a short circuit of the negative electrode and the positive electrode is generated because of the expansion and contraction of the negative electrode containing Si, and a shifting of the electrode due to an elongation of current collector foil. Specifically, it has been found that a negative electrode mixture layer with a structure of a laminated electrode group, and a positive electrode uncoated portion tab are contacted with each other and short-circuited. Herein, a laminated-structure electrode group (laminated electrode group) means an electrode group in which a separator is sandwiched between a positive electrode and a negative electrode in both of which a mixture layer has been formed on a surface of flat plate-shaped current collector foil, and is laminated.

Hereinafter, the present invention will be described by way of Examples. The present invention should not be limited to the Examples described below.

Examples

Specification of Laminated Cell

Table 1 shows specifications of a 1 Ah-class laminated cell in Examples and Comparative Examples. Table 2 shows specifications of a 30 Ah-class laminated cell. Both were the same specification as each other, and two kinds of cells were prepared by the changing of the number of lamination of an electrode and the dimension of the cell. Examples 1 to 30 and Comparative Examples 1 to 10 shown in Table 1 correspond to Examples 31 to 60 and Comparative Examples 11 to 20 shown in Table 2.

In these Tables, a specification of a negative electrode active material, a negative electrode discharge capacity, a material of a negative electrode current collector foil, and a dimension ratio of a laminated electrode group were indicated. Herein, the specification of the negative electrode active material is expressed by a mass ratio of a silicon-based material and a carbonaceous material. The silicon-based material is a Si alloy or SiO. In addition, the carbonaceous material is graphite. Further, as the silicon-based material, $SiO_x$ ($0.5 \leq x \leq 1.5$) can be used. As the carbonaceous material, an amorphous carbon can be used in addition to the graphite.

For all of the positive electrode active material, $LiNi_{0.8}Co_{0.1}Mn_{0.1}O_2$ is used. Other than this, a lithium transition metal oxide etc. capable of being used for the lithium-ion secondary battery can be used.

As the negative electrode active material, any material may be used, as long as the material contains Si, and the discharge capacity in the range of 0 V to 1.5 V based on counter electrode Li is 600 Ah/kg or more to 1100 Ah/kg or less. This time, the discharge capacity was changed by the changing of the mixture ratio using a Si alloy, a mixture system of a Si alloy and graphite, a mixture system of SiO and graphite, and a mixture system of Si and graphite, respectively.

Further, the Si alloy is usually in a state that fine particles of metal silicon (Si) are dispersed in each particle of other metal elements, or in a state that other metal elements are dispersed in each particle of Si. Other metal elements may be any metal elements as long as the metal elements contain any one or more kinds of Al, Ni, Cu, Fe, Ti and Mn. The Si alloy can be prepared by the mechanically synthesizing with a mechanical alloy method, or by the heating and cooling of the mixture of Si particles and other metal elements. This time, the former one was used.

As to the composition of the Si alloy, the one having an atomic ratio of Si and other metal elements of 70:30 was used, however, in the present invention, preferably, the atomic ratio is desirably 50:50 to 90:10, and more desirably 60:40 to 80:20. This time, the atomic ratio was set as 70:30, and $Si_{70}Ti_{15}Fe_{15}$ was used.

In place of SiO, $SiO_x$ ($0.5 \leq x \leq 1.5$) may be used. Si, $SiO_x$, and a Si alloy may be coated by a carbon.

As a binder of a negative electrode, a polyamideimide was used. As a binder, besides this, a polyimide, a polyamide, or a mixture thereof may be used, and further, a binder mixed with other binders such as PVDF or SBR may be used.

TABLE 1

| Item | Specification of negative electrode | Negative electrode discharge capacity | Negative electrode current collector foil | Dimension ratio of laminated electrode group | | |
|---|---|---|---|---|---|---|
| | | | | Positive electrode | Separator | Negative electrode |
| Example 1 | Si alloy:graphite (40:60) | 600 Ah/kg | SUS | 100 | 102 | 100 |
| Example 2 | Si alloy:graphite (40:60) | 600 Ah/kg | Zr-containing Cu | 100 | 102 | 100 |
| Example 3 | Si alloy:graphite (40:60) | 600 Ah/kg | Ag-containing Cu | 100 | 102 | 100 |
| Example 4 | Si alloy:graphite (40:60) | 600 Ah/kg | Sn-containing Cu | 100 | 102 | 100 |
| Example 5 | Si alloy:graphite (40:60) | 600 Ah/kg | Cu | 100 | 104 | 100 |
| Example 6 | Si alloy:graphite (40:60) | 600 Ah/kg | SUS | 102 | 104 | 100 |
| Example 7 | Si alloy:graphite (40:60) | 600 Ah/kg | Zr-containing Cu | 102 | 104 | 100 |
| Example 8 | Si alloy:graphite (40:60) | 600 Ah/kg | Ag-containing Cu | 102 | 104 | 100 |
| Example 9 | Si alloy:graphite (40:60) | 600 Ah/kg | Sn-containing Cu | 102 | 104 | 100 |
| Example 10 | Si alloy:graphite (40:60) | 600 Ah/kg | Cu | 104 | 106 | 100 |
| Example 11 | Si alloy:graphite (40:60) | 600 Ah/kg | SUS | 100 | 104 | 100 |
| Example 12 | Si alloy:graphite (40:60) | 600 Ah/kg | Zr-containing Cu | 100 | 104 | 100 |
| Example 13 | Si alloy:graphite (40:60) | 600 Ah/kg | Ag-containing Cu | 100 | 104 | 100 |
| Example 14 | Si alloy:graphite (40:60) | 600 Ah/kg | Sn-containing Cu | 100 | 104 | 100 |
| Example 15 | Si alloy:graphite (40:60) | 600 Ah/kg | Cu | 100 | 106 | 100 |
| Example 16 | Si alloy:graphite (80:20) | 1100 Ah/kg | SUS | 100 | 102 | 100 |
| Example 17 | Si alloy:graphite (80:20) | 1100 Ah/kg | Zr-containing Cu | 100 | 102 | 100 |
| Example 18 | Si alloy:graphite (80:20) | 1100 Ah/kg | Ag-containing Cu | 100 | 102 | 100 |
| Example 19 | Si alloy:graphite (80:20) | 1100 Ah/kg | Sn-containing Cu | 100 | 102 | 100 |
| Example 20 | Si alloy:graphite (80:20) | 1100 Ah/kg | Cu | 100 | 104 | 100 |
| Example 21 | SiO:graphite (40:60) | 650 Ah/kg | SUS | 100 | 102 | 100 |
| Example 22 | SiO:graphite (40:60) | 650 Ah/kg | Zr-containing Cu | 100 | 102 | 100 |
| Example 23 | SiO:graphite (40:60) | 650 Ah/kg | Ag-containing Cu | 100 | 102 | 100 |
| Example 24 | SiO:graphite (40:60) | 650 Ah/kg | Sn-containing Cu | 100 | 102 | 100 |
| Example 25 | SiO:graphite (40:60) | 650 Ah/kg | Cu | 100 | 104 | 100 |
| Example 26 | Si:graphite (20:80) | 800 Ah/kg | SUS | 100 | 102 | 100 |
| Example 27 | Si:graphite (20:80) | 800 Ah/kg | Zr-containing Cu | 100 | 102 | 100 |
| Example 28 | Si:graphite (20:80) | 800 Ah/kg | Ag-containing Cu | 100 | 102 | 100 |
| Example 29 | Si:graphite (20:80) | 800 Ah/kg | Sn-containing Cu | 100 | 102 | 100 |
| Example 30 | Si:graphite (20:80) | 800 Ah/kg | Cu | 100 | 104 | 100 |
| Comparative Example 1 | Si alloy:graphite (30:70) | 500 Ah/kg | Cu | 98 | 102 | 100 |

TABLE 1-continued

| Item | Specification of negative electrode | Negative electrode discharge capacity | Negative electrode current collector foil | Dimension ratio of laminated electrode group | | |
|---|---|---|---|---|---|---|
| | | | | Positive electrode | Separator | Negative electrode |
| Comparative Example 2 | Si alloy:graphite (30:70) | 500 Ah/kg | Cu | 100 | 102 | 100 |
| Comparative Example 3 | Si alloy:graphite (40:60) | 600 Ah/kg | Cu | 98 | 102 | 100 |
| Comparative Example 4 | Si alloy:graphite (40:60) | 600 Ah/kg | SUS | 98 | 102 | 100 |
| Comparative Example 5 | Si alloy:graphite (40:60) | 600 Ah/kg | Zr-containing Cu | 98 | 102 | 100 |
| Comparative Example 6 | SiO:graphite (40:60) | 650 Ah/kg | Cu | 98 | 102 | 100 |
| Comparative Example 7 | SiO:graphite (40:60) | 650 Ah/kg | SUS | 98 | 102 | 100 |
| Comparative Example 8 | SiO:graphite (40:60) | 650 Ah/kg | Zr-containing Cu | 98 | 102 | 100 |
| Comparative Example 9 | Si:graphite (60:40) | 1500 Ah/kg | SUS | 100 | 102 | 100 |
| Comparative Example 10 | Si alloy | 1300 Ah/kg | SUS | 100 | 102 | 100 |

TABLE 2

| Item | Specification of negative electrode | Negative electrode discharge capacity | Negative electrode current collector foil | Dimension ratio of laminated electrode group | | |
|---|---|---|---|---|---|---|
| | | | | Positive electrode | Separator | Negative electrode |
| Example 31 | Si alloy:graphite (40:60) | 600 Ah/kg | SUS | 100 | 102 | 100 |
| Example 32 | Si alloy:graphite (40:60) | 600 Ah/kg | Zr-containing Cu | 100 | 102 | 100 |
| Example 33 | Si alloy:graphite (40:60) | 600 Ah/kg | Ag-containing Cu | 100 | 102 | 100 |
| Example 34 | Si alloy:graphite (40:60) | 600 Ah/kg | Sn-containing Cu | 100 | 102 | 100 |
| Example 35 | Si alloy:graphite (40:60) | 600 Ah/kg | Cu | 100 | 104 | 100 |
| Example 36 | Si alloy:graphite (40:60) | 600 Ah/kg | SUS | 102 | 104 | 100 |
| Example 37 | Si alloy:graphite (40:60) | 600 Ah/kg | Zr-containing Cu | 102 | 104 | 100 |
| Example 38 | Si alloy:graphite (40:60) | 600 Ah/kg | Ag-containing Cu | 102 | 104 | 100 |
| Example 39 | Si alloy:graphite (40:60) | 600 Ah/kg | Sn-containing Cu | 102 | 104 | 100 |
| Example 40 | Si alloy:graphite (40:60) | 600 Ah/kg | Cu | 104 | 106 | 100 |
| Example 41 | Si alloy:graphite (40:60) | 600 Ah/kg | SUS | 100 | 104 | 100 |
| Example 42 | Si alloy:graphite (40:60) | 600 Ah/kg | Zr-containing Cu | 100 | 104 | 100 |
| Example 43 | Si alloy:graphite (40:60) | 600 Ah/kg | Ag-containing Cu | 100 | 104 | 100 |
| Example 44 | Si alloy:graphite (40:60) | 600 Ah/kg | Sn-containing Cu | 100 | 104 | 100 |
| Example 45 | Si alloy:graphite (40:60) | 600 Ah/kg | Cu | 100 | 106 | 100 |
| Example 46 | Si alloy:graphite (80:20) | 1100 Ah/kg | SUS | 100 | 102 | 100 |
| Example 47 | Si alloy:graphite (80:20) | 1100 Ah/kg | Zr-containing Cu | 100 | 102 | 100 |
| Example 48 | Si alloy:graphite (80:20) | 1100 Ah/kg | Ag-containing Cu | 100 | 102 | 100 |
| Example 49 | Si alloy:graphite (80:20) | 1100 Ah/kg | Sn-containing Cu | 100 | 102 | 100 |
| Example 50 | Si alloy:graphite (80:20) | 1100 Ah/kg | Cu | 100 | 104 | 100 |
| Example 51 | SiO:graphite (40:60) | 650 Ah/kg | SUS | 100 | 102 | 100 |
| Example 52 | SiO:graphite (40:60) | 650 Ah/kg | Zr-containing Cu | 100 | 102 | 100 |
| Example 53 | SiO:graphite (40:60) | 650 Ah/kg | Ag-containing Cu | 100 | 102 | 100 |
| Example 54 | SiO:graphite (40:60) | 650 Ah/kg | Sn-containing Cu | 100 | 102 | 100 |
| Example 55 | SiO:graphite (40:60) | 650 Ah/kg | Cu | 100 | 104 | 100 |
| Example 56 | Si:graphite (20:80) | 800 Ah/kg | SUS | 100 | 102 | 100 |
| Example 57 | Si:graphite (20:80) | 800 Ah/kg | Zr-containing Cu | 100 | 102 | 100 |
| Example 58 | Si:graphite (20:80) | 800 Ah/kg | Ag-containing Cu | 100 | 102 | 100 |
| Example 59 | Si:graphite (20:80) | 800 Ah/kg | Sn-containing Cu | 100 | 102 | 100 |
| Example 60 | Si:graphite (20:80) | 800 Ah/kg | Cu | 100 | 104 | 100 |
| Comparative Example 11 | Si alloy:graphite (30:70) | 500 Ah/kg | Cu | 98 | 102 | 100 |
| Comparative Example 12 | Si alloy:graphite (30:70) | 500 Ah/kg | Cu | 100 | 102 | 100 |
| Comparative Example 13 | Si alloy:graphite (40:60) | 600 Ah/kg | Cu | 98 | 102 | 100 |
| Comparative Example 14 | Si alloy:graphite (40:60) | 600 Ah/kg | SUS | 98 | 102 | 100 |
| Comparative Example 15 | Si alloy:graphite (40:60) | 600 Ah/kg | Zr-containing Cu | 98 | 102 | 100 |
| Comparative Example 16 | SiO:graphite (40:60) | 650 Ah/kg | Cu | 98 | 102 | 100 |
| Comparative Example 17 | SiO:graphite (40:60) | 650 Ah/kg | SUS | 98 | 102 | 100 |
| Comparative Example 18 | SiO:graphite (40:60) | 650 Ah/kg | Zr-containing Cu | 98 | 102 | 100 |
| Comparative Example 19 | Si:graphite (20:80) | 1500 Ah/kg | SUS | 100 | 102 | 100 |
| Comparative Example 20 | Si alloy | 1300 Ah/kg | SUS | 100 | 102 | 100 |

(Preparation of Negative Electrode)

Firstly, in addition to the above-described negative electrode active material and binder, an acetylene black was used as a conductive material. The mass ratio of the negative electrode active material, the binder and the acetylene black is 92:5:3. The mixture thereof was used for the preparation. And a negative electrode slurry was prepared while mixing a solvent (N-methyl-2-pyrrolidone (NMP)) so that the viscosity is 5000 to 8000 mPa, and further the solid content ratio is 70% or more and 90% or less. Further, the viscosity in the present specification is a value of 600th second (a value after stirring the slurry for 600 second) at 0.5 rpm. In addition, a planetary mixer was used in the preparation of the slurry.

The obtained negative electrode slurry was used to be coated on a current collector foil by a desktop comma coater. As the current collector foil, either one of a stainless steel (SUS444), a copper alloy in which a dissimilar element (at least one or more kinds among zirconium, silver, and tin) is mixed into copper with a purity of 99.99% or more, or copper with a purity of 99.99% or more was used.

Further, the pure copper foil (purity 99.99% or more) has a large thermal expansion coefficient. Hence, it causes the large shifting, and the short circuit generated easily as compared with stainless steel. Therefore, lengths of a positive electrode mixture layer and a separator are required to be longer than those in a case of the stainless steel.

As to the coating amount, a coating amount of the negative electrode was adjusted so that the capacity ratio of the positive electrode and the negative electrode is 1.0 when the positive electrode is coated at a coating amount of 240 g/m$^2$.

In a drying step, a primary drying was performed by using a drying furnace with an in-furnace temperature of 100° C. to obtain a negative electrode.

(Preparation of Laminated Cell)

Figure 1:
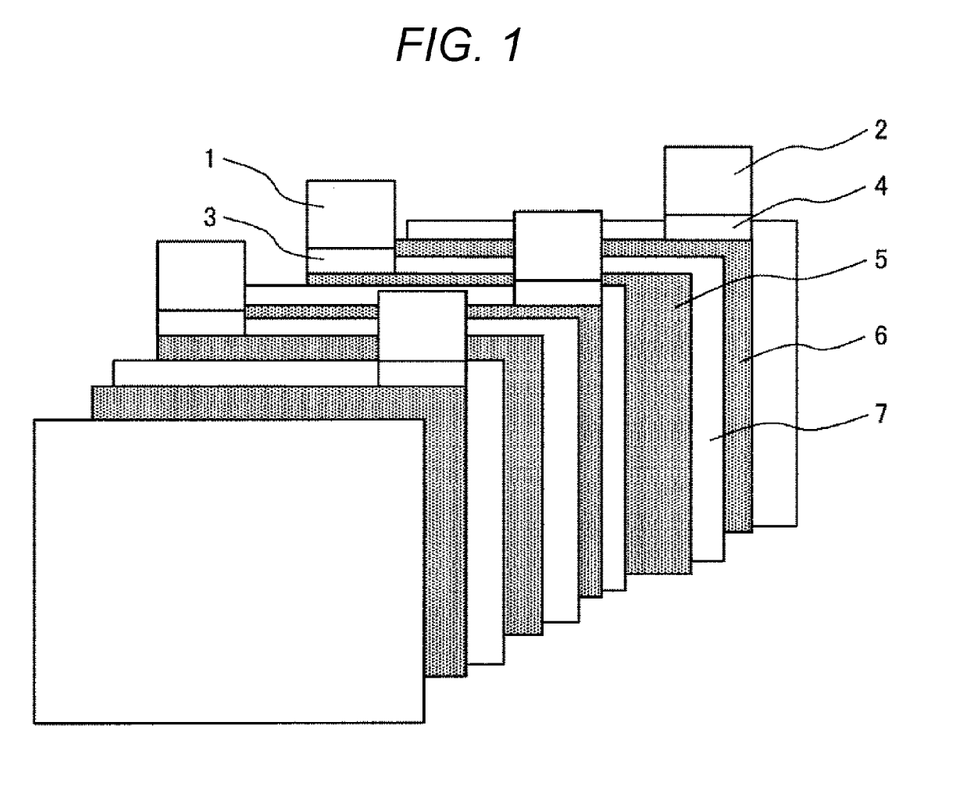
FIG. 1 is an exploded view showing a laminated electrode group inside a laminated cell.

FIG. 1 is an exploded view showing a laminated electrode group inside a laminated cell.

In the present view, the laminated electrode group has a constitution in which a plate-shaped positive electrode 5 and a plate-shaped negative electrode 6 are sandwiched between separators 7, and laminated.

The positive electrode 5 has an aluminum foil as a positive electrode current collector foil. On both surfaces of the aluminum foil, a positive electrode mixture layer is formed. As the positive electrode active material mixture used for forming a positive electrode mixture layer, $LiNi_{0.8}Co_{0.1}Mn_{0.1}O_2$ of a positive electrode active material, a conductive material of a carbon material, and a binder (binding material) of polyvinylidene fluoride (hereafter, abbreviated as PVDF) were mixed to be used. The mass ratio of the positive electrode active material, the conductive material, and the binder is set as 90:5:5 in this order, and the preparation was performed with the coating amount of the mixture of 240 g/m$^2$. When the positive electrode active material mixture is coated on the aluminum foil, the viscosity was adjusted by a dispersion solvent of N-methyl-2-pyrrolidone (NMP). At this time, a positive electrode uncoated portion 3 in which a positive electrode active material mixture has not coated is generated in a part of the aluminum foil. That is, the aluminum foil is exposed in the positive electrode uncoated portion 3. As to the positive electrode 5, the density is adjusted by a roll press after drying, and the preparation was performed at a density of 3.0 g/cm$^3$ in this time.

On the other hand, as to the negative electrode 6, a negative electrode coated in the "Preparation of negative electrode" described above was subjected to a vacuum drying (a secondary drying) at 300° C. for one hour, and then the density was adjusted by a roll press. Further, the pressing was performed so that voids of an electrode are around 20 to 40%. The density after the pressing was 1.3 to 1.5 g/cm$^3$ in a case of a negative electrode containing Si and SiO. On the other hand, the density was 2.0 to 2.5 g/cm$^3$ in a case of a negative electrode containing a Si alloy.

Further, during the processing, a negative electrode uncoated portion 4 in which a negative electrode active material mixture is not coated has generated in part of the current collector foil. That is, the current collector foil is exposed in the negative electrode uncoated portion 4.

As the separator, a material through which a lithium ion is not passed by thermal contraction may be used. For example, polyolefin and the like are used. The polyolefin is characterized by mainly containing at least one kind of polyethylene, polypropylene, and the like. However, the polyolefin may contain a heat-resistant resin such as polyamide, polyamideimide, polyimide, polysulfone, polyethersulfone, polyphenylsulfone, and polyacrylonitrile. Further, an inorganic filler layer may be coated on one side or both sides of the separator.

The inorganic filler layer is characterized by containing at least one kind of $SiO_2$, $Al_2O_3$, montmorillonite, mica, ZnO, $TiO_2$, $BaTiO_3$, and $ZrO_2$. However, the inorganic filler layer contains $SiO_2$ or $Al_2O_3$ most preferably in view of cost and performance.

Further, using the following separator is desirable. That is, a peripheral part of the separator is welded by heat so as to wrap the positive electrode or the negative electrode, and the separator is formed into a bag shape. If the width of the heat-welded part in the peripheral part is 0.5 to 2 mm, the production can be performed, and the influence on the dimension of the entire battery is small, therefore, this is desired.

Either one of the positive electrode or the negative electrode may be wrapped by the separator with the bag shape, however, it is considered that the way in which the negative electrode is wrapped is easier to be used in the production, and in which the reliability of the battery is high, therefore, this way is more desired.

The positive electrode uncoated portion 3 is bundled and a part of a positive electrode terminal 1 is welded by an ultrasonic wave. On the other hand, the negative electrode uncoated portion 4 is bundled and a part of a negative electrode terminal 2 is welded by an ultrasonic wave. The positive electrode terminal 1 and the negative electrode terminal 2 make an electrical connection between the inside and outside of the battery. As the welding method, other welding techniques such as resistance welding may be used. Further, as to the positive electrode terminal 1 and the negative electrode terminal 2, a heat-weldable resin may be coated or attached in advance onto the sealing part of the terminal, in order to ensure the sealing of a battery.

In addition, in order to suppress the shifting of an electrode group in charging and discharging, the center of the four sides of a laminated electrode group was fixed in the thickness direction by Kapton (registered trademark) tape.

Further, this time, in the laminated electrode group, two sheets of positive electrodes and three sheets of negative electrodes were laminated in a 1 Ah-class laminated cell in Table 1, and 27 sheets of positive electrodes and 28 sheets of negative electrodes were laminated in a 30 Ah-class laminated cell in Table 2. However, any number of sheets may be used. In addition, as to dimensions of the electrode, the preparation was performed with the ratios shown in Table 1 and Table 2. Practically, the preparation was performed in the negative electrode with 50 mm length×100 mm width in the 1 Ah-class laminated cell, and the preparation was performed in the negative electrode with 100 mm length×width 120 mm width in the 30 Ah-class laminated cell.

FIGS. 2 to 6 respectively show a sectional view of a pair of an electrode pair that constitutes a laminated electrode group in Examples and Comparative Examples. These correspond to the ratios of the dimension (the ratios of the length) of a positive electrode, a negative electrode, and a separator described in Tables 1 and 2. In the present Examples, the standard length is set as 50 to 100 mm as described above. However, the dimension is not necessarily limited to this, the present invention can be applied to any electrode pair as long as the electrode pair are an electrode pair having a predetermined dimension ratio.

Using FIG. 2, the cross section shape of the electrode pair will be described.

In the present view, the electrode pair is constituted of a plate-shaped positive electrode 5, a plate-shaped negative electrode 6, and a separator 7 sandwiched between these electrodes. The positive electrode 5 includes positive electrode current collector foil, and a positive electrode mixture layer that is formed on both surface of the positive electrode current collector foil. On the positive electrode current collector foil, a positive electrode terminal 1 is connected by welding. On the other hand, the negative electrode 6 includes negative electrode current collector foil, and a negative electrode mixture layer that is formed on both surface of the negative electrode current collector foil. On the negative electrode current collector foil, a negative electrode terminal 2 is connected by welding.

In a case of an electrode pair shown in the present view, the lengths of the positive electrode mixture layer and the negative electrode mixture layer are 100 mm, respectively in a direction where the positive electrode terminal 1 and the negative electrode terminal 2 are protruded (in the view, vertical direction). Further, the separator 7 has a constitution of protruding upward 2 mm from the positive electrode mixture layer and the negative electrode mixture layer in the view.

Figure 2:
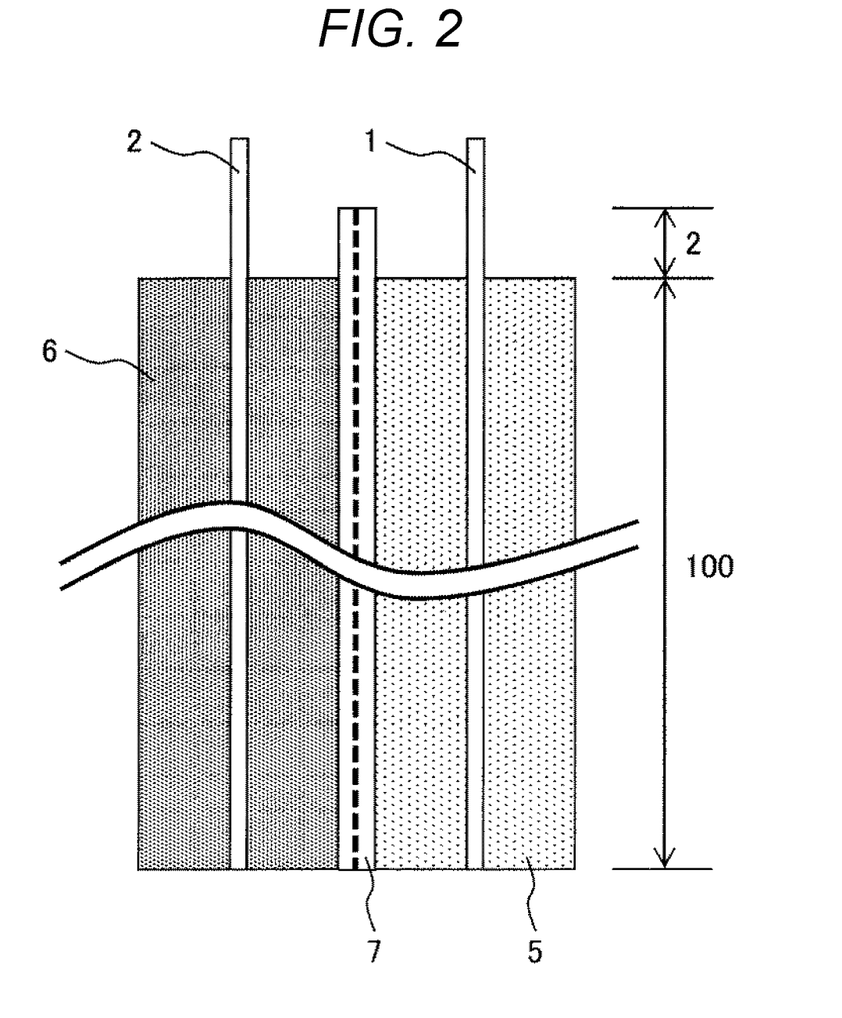
FIG. 2 is a sectional view showing a laminated electrode group inside a laminated cell corresponding to Examples 1 to 4, Examples 16 to 19, Examples 21 to 24, Examples 26 to 29, and Comparative Examples 2 and 9 to 10.

In FIGS. 3 to 6, since the sectional view is the same as that in FIG. 2, the explanation of the arrangement of electrodes is omitted except for the dimensions. Hereinafter, "length" means a dimension in the vertical direction in the view.

Figure 3:
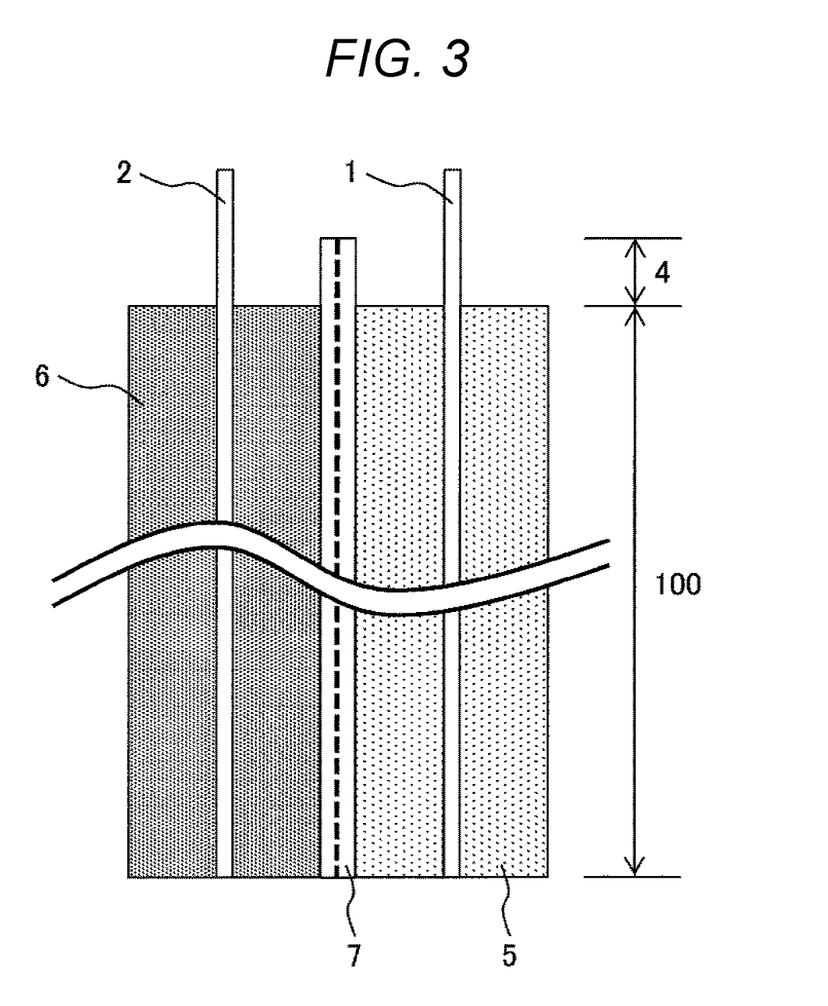
FIG. 3 is a sectional view showing a laminated electrode group inside a laminated cell corresponding to Example 5, Examples 11 to 14, Example 20, Example 25, and Example 30.

In a case of an electrode pair shown in FIG. 3, the length of the positive electrode mixture layer and the negative electrode mixture layer are 100 mm, respectively in a direction where the positive electrode terminal 1 and the negative electrode terminal 2 are protruded (in the view, vertical direction). Further, the separator 7 has a constitution of protruding upward 4 mm from the positive electrode mixture layer and the negative electrode mixture layer.

Figure 4:
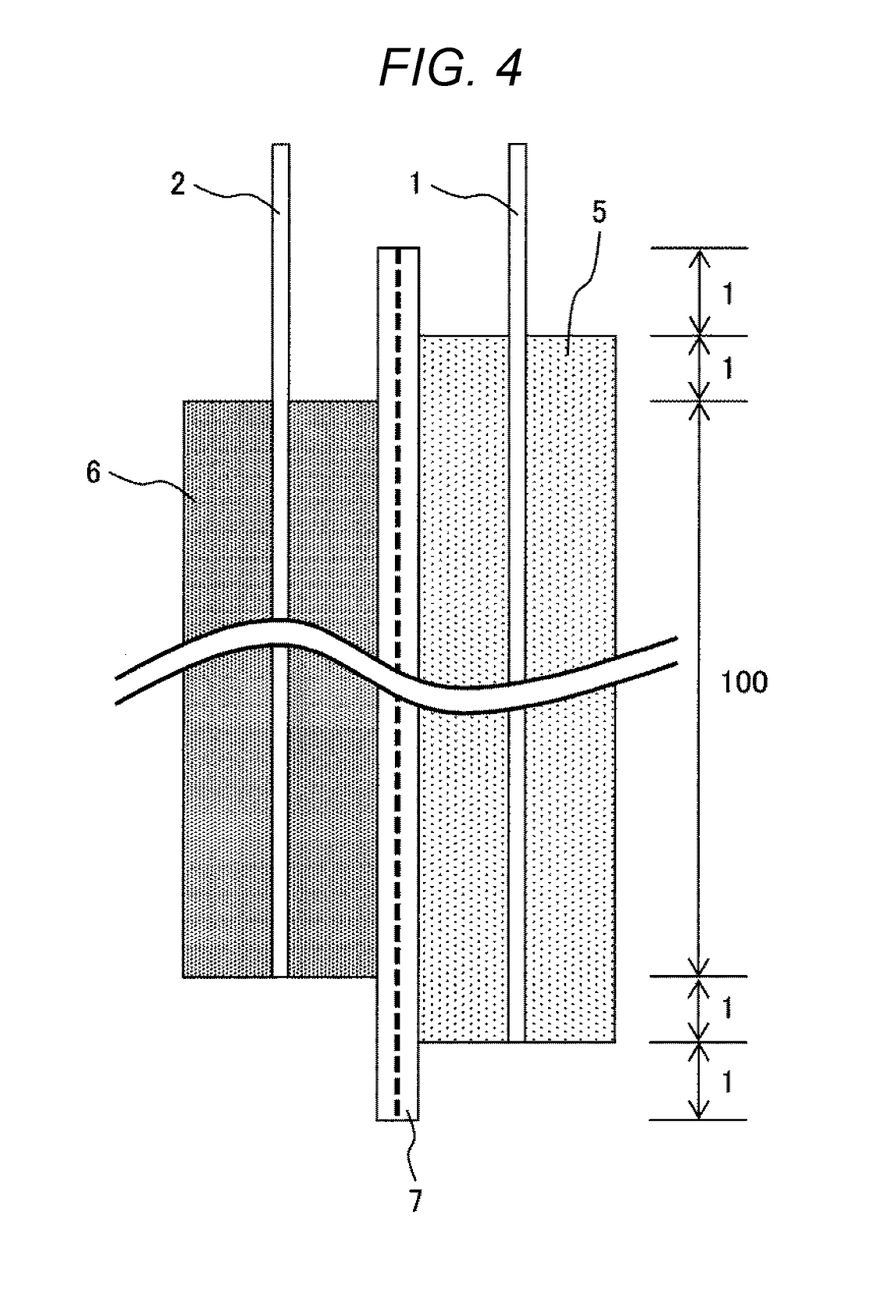
FIG. 4 is a sectional view showing a laminated electrode group inside a laminated cell corresponding to Examples 6 to 9.

In a case of an electrode pair shown in FIG. 4, the length of the negative electrode mixture layer is 100 mm. On the other hand, the length of the positive electrode mixture layer is longer as compared with the negative electrode mixture layer by 1 mm in the upward and downward directions, and is 102 mm. The length of the separator 7 is further longer as compared with the positive electrode mixture layer by 1 mm in the upward and downward directions, and is 104 mm.

Figure 5:
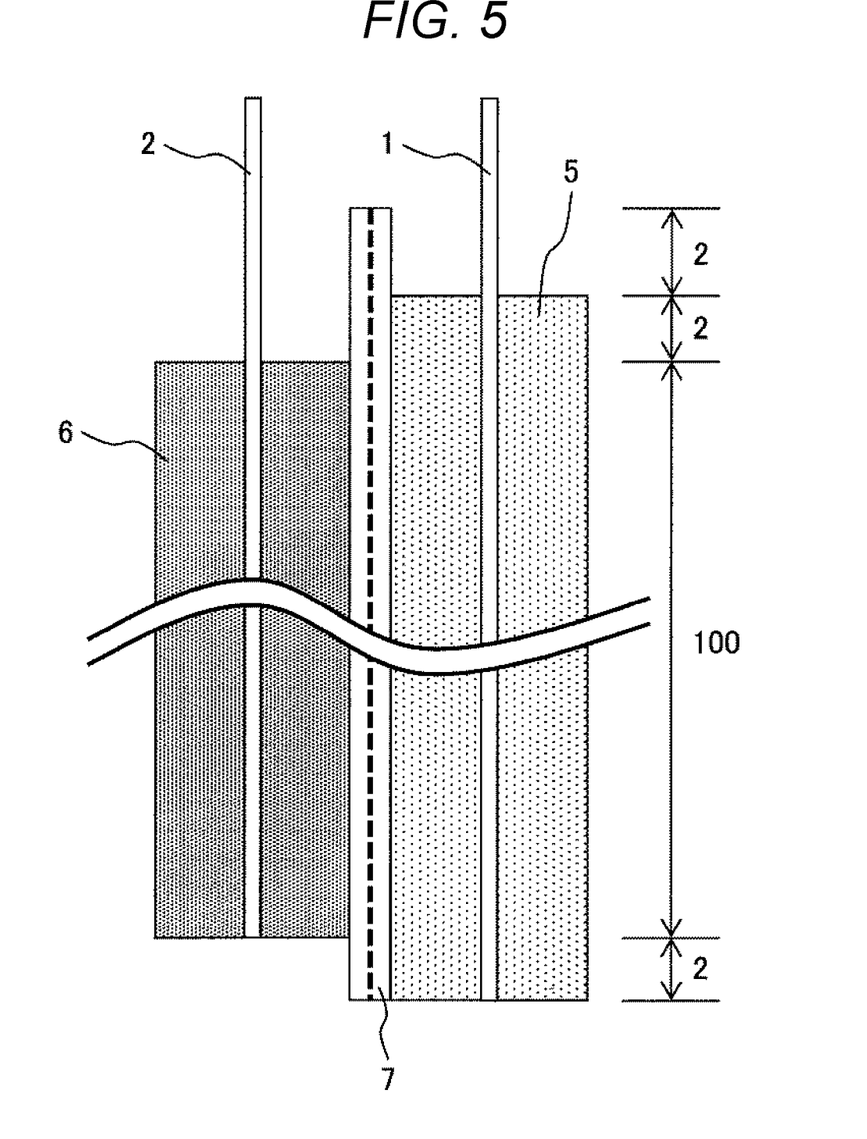
FIG. 5 is a sectional view showing a laminated electrode group inside a laminated cell corresponding to Example 10.

In a case of an electrode pair shown in FIG. 5, the length of the negative electrode mixture layer is 100 mm. On the other hand, the length of the positive electrode mixture layer is longer as compared with the negative electrode mixture layer by 2 mm in the upward and downward directions, and is 104 mm. The length of the separator 7 is further longer as compared with the positive electrode mixture layer by 2 mm in the upward direction, and is 106 mm.

Figure 6:
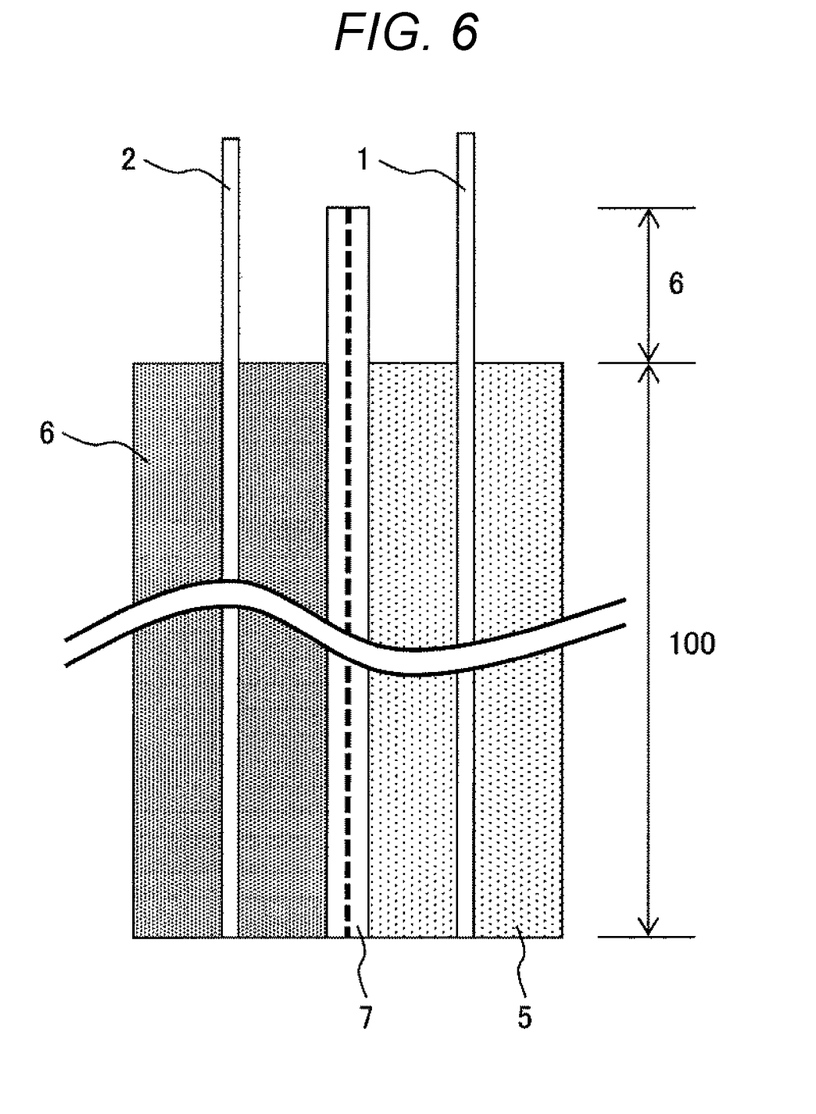
FIG. 6 is a sectional view showing a laminated electrode group inside a laminated cell corresponding to Example 15.

In a case of an electrode pair shown in FIG. 6, each length of the positive electrode mixture layer and the negative electrode mixture layer is 100 mm. Further, the separator 7 has a constitution of protruding upward 6 mm from the positive electrode mixture layer and the negative electrode mixture layer.

Figure 7:
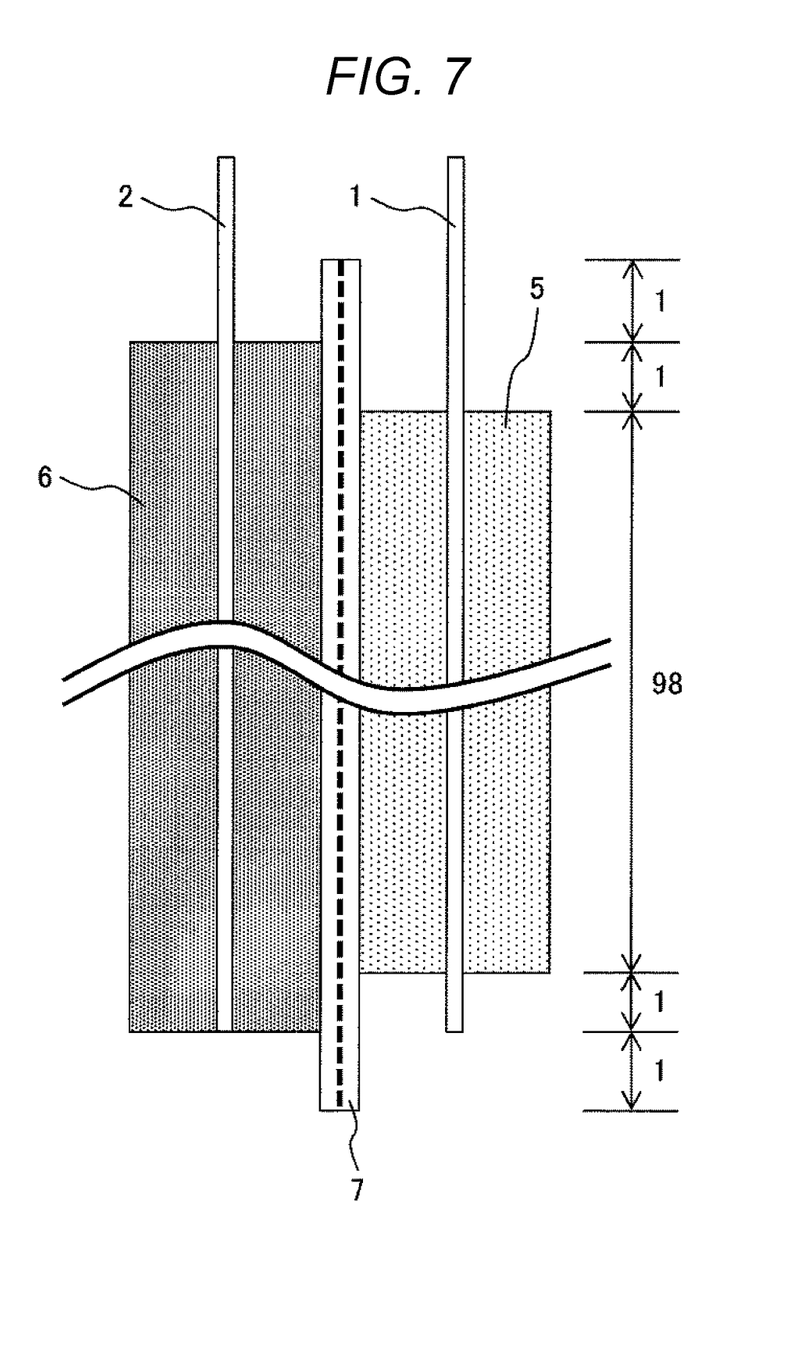
FIG. 7 is a sectional view showing a laminated electrode group inside a laminated cell corresponding to Comparative Examples 1 and 3 to 8.

In a case of an electrode pair shown in FIG. 7, the length of the negative electrode mixture layer is 100 mm. On the other hand, the length of the positive electrode mixture layer is shorter as compared with the negative electrode mixture layer by 1 mm in the upward and downward directions, and is 98 mm. The length of the separator 7 is longer as compared with the negative electrode mixture layer by 1 mm in the upward and downward directions, and is 102 mm.

Figure 8:
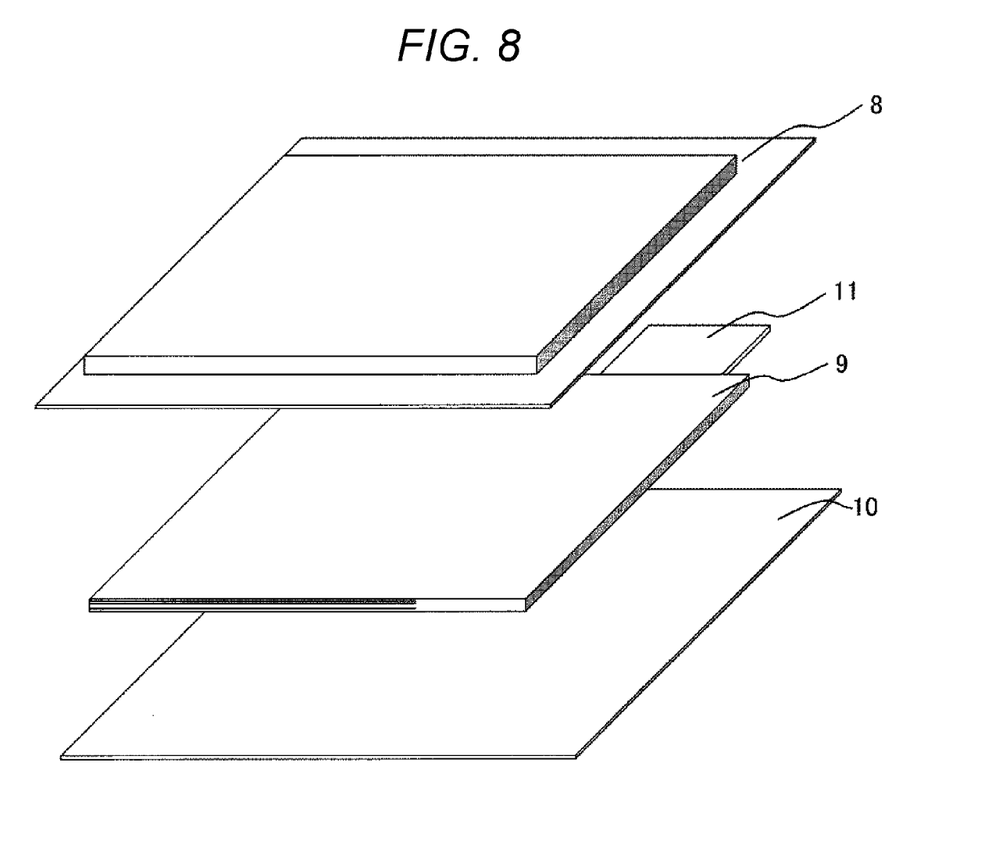
FIG. 8 is an exploded perspective view showing an example of a laminated cell.

FIG. 8 is an exploded perspective view showing an example of a laminated cell.

The laminated cell shown in the present view has a constitution in which an electrode group 9 is sandwiched between two sheets of laminate films 8 and 10. Edges of the laminate films 8 and 10 are sealed by heat welding at 175° C. for 10 seconds. Further, in an electrically insulated state, a positive electrode terminal 1 and a negative electrode terminal 2 are penetrated. As to the sealing, in order to provide a liquid injection port, sides other than one side are firstly welded by heat, and into which an electrolyte is injected, then the remaining one side is sealed by the heat welding while applying vacuum pressure. In the heat-welded part, the heat welding strength is weaker as compared with that in other sides, and an effect of a gas discharge valve is exerted. In the present invention, a thin part and the like may be provided in other parts, and a part having a gas discharge mechanism may be provided. As the electrolyte, an electrolyte in which $LiPF_6$ that is an electrolyte is dissolved into a mixed solvent of ethylene carbonate (EC) and ethyl methyl carbonate (EMC) is used. Herein, the mixed solvent is set as EC:EMC=1:3 based on volume. The concentration of $LiPF_6$ in the electrolyte is set as 1 M.

As the electrolyte, an organic electrolyte solution prepared by dissolving one or more kinds of lithium salts into one or more kinds of non-aqueous solvents may be used. The lithium salts are selected from $LiPF_6$, $LiBF_4$, $LiClO_4$, $LiN(C_2F_5SO_2)_2$, and the like, for example. The non-aqueous solvents are selected from ethylene carbonate, propylene carbonate, butylene carbonate, dimethyl carbonate, ethyl methyl carbonate, diethyl carbonate, γ-butyrolactone, γ-valerolactone, methyl acetate, ethyl acetate, methyl propionate, tetrahydrofuran, 2-methyltetrahydrofuran, 1,2-dimethoxyethan, 1-ethoxy-2-methoxyethene, 3-methyltetrahydrofuran, 1,2-dioxane, 1,3-dioxane, 1,4-dioxane, 1,3-dioxolane, 2-methyl-1,3-dioxolane, 4-methyl-1,3-dioxolane, and the like, for example. Further, as the electrolyte, a solid electrolyte having conductivity of a lithium ion, a gel electrolyte, or a known electrolyte used in a molten salt battery and other batteries may also be used.

(Short Circuiting Ratio and Capacity Retention of Laminated Cell)

Using the prepared laminated cell, a constant current charge was performed with a voltage of 4.3 V and a current of ⅓ CA, and then a constant voltage charge was performed for two hours. As to the discharge, a constant current discharge was performed with a voltage of 2.0 V and a current of ⅓ CA. This was performed 10 cycles, and a capacity retention was calculated from the quotient of the capacity at the 10th cycle and the capacity at the 1st cycle. Further, in order to investigate the short circuit, a constant current charge was performed with a voltage of 3.7 V and a current of ⅓ CA, then a constant voltage charge was performed for two hours, and the resultant was left for one week. After the leaving, the one with a state of 3.4 V or less was defined as "short circuit", and the number of short circuits in 10 cells was calculated as a short circuit ratio.

The results of a 1 Ah-class laminated cell are shown in Table 3, and the results of a 30 Ah-class laminated cell are shown in Table 4.

The short circuit was not observed in Examples 1 to 30 of 1 Ah-class and Examples 31 to 60 of 30 Ah-class. Further, the short circuit can be suppressed by the extension of the length of a separator. However, the present range is extremely favorable in consideration of the cost and volume. In addition, the negative electrode is expanded in the direction perpendicularly to the lamination direction during the charging even only by the mixture layer, therefore, the present range is effective by the definition of the dimensions during the charging.

On the other hand, in Comparative Examples 1 and 2, a negative electrode mixture with a ratio of a Si alloy and graphite of 30:70 based on mass was used. In this case, the short circuit was not observed regardless of the dimensions of the positive electrode and negative electrode. This is considered because the amount of the expansion and contraction is small. From the in-situ observation results in charging and discharging, it is presumed because the mixture layer on a current collector foil protrudes less from the current collector foil in the above-described length direction. As a result, it is considered that the negative electrode mixture layer with a structure of the laminated electrode group, and the positive electrode uncoated portion tab are not contacted with each other.

However, as shown in Comparative Examples 3 to 5, in a case of a ratio of a Si alloy and graphite of 40:60 based on mass, and as shown in Comparative Examples 6 to 8, in a case of a ratio of SiO and graphite of 40:60 based on mass, the discharge capacity becomes 600 Ah/kg or more. In these cases, a negative electrode mixture layer with a structure of a laminated electrode group, and a positive electrode uncoated portion tab were contacted with each other and the short circuit was generated.

Further, as shown in Comparative Examples 9 and 10, when the discharge capacity exceeds 1100 Ah/kg, although the short circuit was not generated, the capacity was lost in 10 cycles, and could not exert the function as a secondary battery.

TABLE 3

| Item | After 10 cycles | |
|---|---|---|
| | Short circuit ratio | Capacity retention |
| Example 1 | 0% | 90% |
| Example 2 | 0% | 90% |
| Example 3 | 0% | 90% |
| Example 4 | 0% | 90% |
| Example 5 | 0% | 90% |
| Example 6 | 0% | 90% |
| Example 7 | 0% | 90% |
| Example 8 | 0% | 90% |
| Example 9 | 0% | 90% |
| Example 10 | 0% | 90% |
| Example 11 | 0% | 90% |
| Example 12 | 0% | 90% |
| Example 13 | 0% | 90% |
| Example 14 | 0% | 90% |
| Example 15 | 0% | 90% |
| Example 16 | 0% | 60% |
| Example 17 | 0% | 60% |
| Example 18 | 0% | 60% |
| Example 19 | 0% | 60% |
| Example 20 | 0% | 60% |
| Example 21 | 0% | 90% |
| Example 22 | 0% | 90% |
| Example 23 | 0% | 90% |
| Example 24 | 0% | 90% |
| Example 25 | 0% | 90% |
| Example 26 | 0% | 50% |
| Example 27 | 0% | 50% |
| Example 28 | 0% | 50% |
| Example 29 | 0% | 50% |
| Example 30 | 0% | 50% |
| Comparative Example 1 | 0% | 90% |
| Comparative Example 2 | 0% | 90% |
| Comparative Example 3 | 70% | 90% |
| Comparative Example 4 | 40% | 90% |
| Comparative Example 5 | 40% | 90% |
| Comparative Example 6 | 60% | 90% |
| Comparative Example 7 | 40% | 90% |
| Comparative Example 8 | 40% | 90% |
| Comparative Example 9 | 0% | 5% |
| Comparative Example 10 | 0% | 10% |

TABLE 4

| Item | After 10 cycles | |
|---|---|---|
| | Short circuit ratio | Capacity retention |
| Example 31 | 0% | 95% |
| Example 32 | 0% | 95% |
| Example 33 | 0% | 95% |
| Example 34 | 0% | 95% |
| Example 35 | 0% | 95% |
| Example 36 | 0% | 95% |
| Example 37 | 0% | 95% |
| Example 38 | 0% | 95% |
| Example 39 | 0% | 95% |
| Example 40 | 0% | 95% |
| Example 41 | 0% | 95% |
| Example 42 | 0% | 95% |
| Example 43 | 0% | 95% |
| Example 44 | 0% | 95% |
| Example 45 | 0% | 95% |
| Example 46 | 0% | 60% |
| Example 47 | 0% | 60% |
| Example 48 | 0% | 60% |
| Example 49 | 0% | 60% |
| Example 50 | 0% | 60% |
| Example 51 | 0% | 95% |
| Example 52 | 0% | 95% |
| Example 53 | 0% | 95% |
| Example 54 | 0% | 95% |
| Example 55 | 0% | 95% |
| Example 56 | 0% | 50% |
| Example 57 | 0% | 50% |
| Example 58 | 0% | 50% |
| Example 59 | 0% | 50% |
| Example 60 | 0% | 50% |
| Comparative Example 11 | 0% | 95% |
| Comparative Example 12 | 0% | 95% |
| Comparative Example 13 | 70% | 95% |
| Comparative Example 14 | 40% | 95% |
| Comparative Example 15 | 40% | 95% |
| Comparative Example 16 | 60% | 95% |
| Comparative Example 17 | 40% | 95% |
| Comparative Example 18 | 40% | 95% |
| Comparative Example 19 | 0% | 5% |
| Comparative Example 20 | 0% | 10% |

As described above, the short circuit in charging and discharging can be suppressed by a lithium-ion secondary battery characterized in that in a lithium-ion secondary battery constituted of a positive electrode, a separator, and a negative electrode, and having a structure of laminated electrode group in which collection terminals of the positive electrode and negative electrode protrude from the same one side, the negative electrode contains Si, the discharge capacity in the range of 0 V to 1.5 V based on counter electrode Li is 600 Ah/kg or more to 1000 Ah/kg or less, the current collector foil of a negative electrode is stainless steel foil, or copper foil in which dissimilar elements (one or more elements selected from the group consisting of zirconium, silver, and tin) are contained in copper with a purity of 99.99% or more, and when a comparison are drawn between the lengths of the positive electrode mixture layer, the separator, and the negative electrode mixture layer in the protruding direction of the collection terminal, based on the negative electrode mixture layer 100, the positive electrode mixture layer is 100 or more to 102 or less, and the separator is 102 or more to 104 or less.

What is claimed is:

1. A lithium-ion secondary battery comprising:
   a rectangular positive electrode;
   a rectangular negative electrode; and
   a separator,
   wherein the positive electrode, the negative electrode, and the separator constitute a laminated electrode group,
   the separator is coated on one or more sides with an inorganic filler containing at least $SiO_2$, $Al_2O_3$, montmorillonite, mica, SnO, $TiO_2$, $BaTiO_3$, and ZrO2,
   the positive electrode includes a positive electrode current collector foil, and a positive electrode mixture layer containing a positive electrode active material,
   the negative electrode includes a negative electrode current collector foil, and a negative electrode mixture layer containing a negative electrode active material,
   the negative electrode active material includes a silicon-based material, and a carbonaceous material,
   the negative electrode includes a binder comprising one or more of the following: polyamideimide, polyimide, polyamide, PVDF, or SBR,
   a mass ratio of the silicon-based material and the carbonaceous material is 20:80 to 69:31,
   the silicon-based material is a Si alloy or $SiO_x$ ($0.5 \leq x \leq 1.5$),
   the positive electrode and the negative electrode have a collection terminal protruding from a same side of the laminated electrode group,
   the negative electrode current collector foil is formed of any one of a stainless steel; a copper alloy containing copper with a purity of 99.9% or more and one or more kinds of elements selected from the group consisting of zirconium, silver and tin; and
   when comparisons are drawn between lengths of the positive electrode mixture layer and the negative electrode mixture layer in a direction where the collection terminal protrudes from the same side, the length of the positive electrode mixture layer is the length of the negative electrode mixture layer or longer.

2. The lithium-ion secondary battery according to claim 1, wherein
   the negative electrode current collector foil is formed of a stainless steel; and
   when comparisons are drawn between the lengths of the positive electrode mixture layer, the negative electrode mixture layer and the separator in a direction where the collection terminal protrudes from the same side, the length of the positive electrode mixture layer is 100 or more and 102 or less, and the length of the separator is 102 or more and 104 or less in a case where the length of the negative electrode mixture layer is set as 100.

3. The lithium-ion secondary battery according to claim 2, wherein
   the Si alloy contains Si; and one or more kinds of dissimilar metal elements selected from the group consisting of Al, Ni, Cu, Fe, Ti and Mn, and an atomic ratio of the Si and the dissimilar metal elements is 50:50 to 90:10.

4. The lithium-ion secondary battery according to claim 3, wherein
   the silicon-based material is the Si alloy,
   the carbonaceous material is graphite, and
   a mass ratio of the silicon-based material and the carbonaceous material is 40:60 to 69:31.

5. The lithium-ion secondary battery according to claim 4, wherein
   the separator has a bag shape.

6. The lithium-ion secondary battery according to claim 5, wherein
   the separator is constituted so as to wrap the negative electrode.

7. The lithium-ion secondary battery according to claim 1, wherein
   the negative electrode current collector foil is formed of a copper with a purity of 99.99% or more,
   when a comparison are drawn between lengths of the positive electrode mixture layer, the negative electrode mixture layer, and the separator in a direction where the collection terminal protrudes from the same side, the length of the positive electrode mixture layer is 100 or more and 104 or less, and the length of the separator is 104 or more and 106 or less in a case where the length of the negative electrode mixture layer is set as 100.

8. The lithium-ion secondary battery according to claim 7, wherein
   the Si alloy contains Si; and one or more kinds of dissimilar metal elements selected from the group consisting of Al, Ni, Cu, Fe, Ti and Mn, and an atomic ratio of the Si and the dissimilar metal elements is 50:50 to 90:10.

9. The lithium-ion secondary battery according to claim 1, wherein
   a discharge capacity in a range of 0 V to 1.5 V based on a counter electrode Li of the negative electrode is 600 Ah/kg or more and 1100 Ah/kg or less.

10. The lithium-ion secondary battery according to claim 9, wherein
    the Si alloy contains Si; and one or more kinds of dissimilar metal elements selected from the group consisting of Al, Ni, Cu, Fe, Ti and Mn, and an atomic ratio of the Si and the dissimilar metal elements is 50:50 to 90:10.

* * * * *